United States Patent
Mederer (10) Patent No.: US 8,944,525 B2
(45) Date of Patent: Feb. 3, 2015

(54) VALVE ARRANGEMENT FOR CONTROLLING A BRAKE SYSTEM OF A TRAILER VEHICLE

(75) Inventor: Martin Mederer, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 1206 days.

(21) Appl. No.: 12/672,028

(22) PCT Filed: Aug. 1, 2008

(86) PCT No.: PCT/EP2008/006339
§ 371 (c)(1), (2), (4) Date: Sep. 19, 2011

(87) PCT Pub. No.: WO2009/021642
PCT Pub. Date: Feb. 19, 2009

(65) Prior Publication Data
US 2012/0001477 A1    Jan. 5, 2012

(30) Foreign Application Priority Data

Aug. 14, 2007   (DE) .......................... 10 2007 038 472

(51) Int. Cl.
  *B60T 13/68*   (2006.01)
  *B60T 15/02*   (2006.01)
(52) U.S. Cl.
  CPC ............. *B60T 13/683* (2013.01); *B60T 15/027* (2013.01)
  USPC .................... 303/9.76; 303/3; 303/7; 303/15; 303/123; 303/127
(58) Field of Classification Search
  USPC ............................ 303/3, 7, 9.76, 15, 123, 127
  See application file for complete search history.

(56) References Cited

U.S. PATENT DOCUMENTS

| | | | | | |
|---|---|---|---|---|---|
| 3,348,638 | A | * | 10/1967 | Littmann | 188/162 |
| 3,992,064 | A | * | 11/1976 | Carton et al. | 303/7 |
| 4,131,324 | A | * | 12/1978 | Kurichh | 303/7 |
| 4,801,179 | A | * | 1/1989 | Hintner | 303/22.2 |

(Continued)

FOREIGN PATENT DOCUMENTS

| | | |
|---|---|---|
| DE | 28 10 850 | 10/1979 |
| DE | 29 23 359 | 12/1980 |

(Continued)

OTHER PUBLICATIONS

European Patent Office, Translation of International Preliminary Report on Patentability and Written Opinion, Feb. 25, 2010, from International Patent Application No. PCT/EP2008/006339, filed on Aug. 1, 2008.

*Primary Examiner* — Robert A Siconolfi
*Assistant Examiner* — James Hsiao
(74) *Attorney, Agent, or Firm* — Kenyon & Kenyon LLP (57) ABSTRACT

A valve arrangement for controlling a brake system, comprising at least one spring brake cylinder and at least one service brake cylinder, of a trailer vehicle of a traction vehicle-trailer combination, characterized in that said valve arrangement includes a 3/2 way valve which, as a function of the control pressure present at its control inlet, connects either its connection, which is connected to an outlet of a control valve device in order to generate service brake pressure for the at least one service brake cylinder, or connects its connection, which is connected to a trailer-vehicle-side compressed air supply, to its further connection which is connected to the at least one spring brake cylinder.

11 Claims, 3 Drawing Sheets

(56) References Cited

U.S. PATENT DOCUMENTS

| | | | |
|---|---|---|---|
| 4,915,456 A * | 4/1990 | Gross et al. | 303/9 |
| 5,042,883 A * | 8/1991 | McCann et al. | 303/7 |
| 5,236,250 A * | 8/1993 | Moody et al. | 303/7 |
| 5,427,440 A * | 6/1995 | Ward et al. | 303/3 |
| 5,445,440 A * | 8/1995 | Plantan | 303/7 |
| 5,458,403 A * | 10/1995 | Moody | 303/7 |
| 5,553,928 A * | 9/1996 | Hart et al. | 303/7 |
| 6,247,764 B1 * | 6/2001 | Koelzer | 303/118.1 |
| 6,367,888 B1 * | 4/2002 | Kee et al. | 303/89 |
| 6,540,307 B1 * | 4/2003 | Ward et al. | 303/3 |
| 6,997,522 B2 * | 2/2006 | Kemer | 303/7 |
| 7,073,873 B2 * | 7/2006 | Kemer | 303/7 |
| 8,290,679 B2 * | 10/2012 | Bensch et al. | 701/78 |
| 2003/0006644 A1 * | 1/2003 | MacGregor et al. | 303/3 |
| 2005/0137767 A1 * | 6/2005 | Goebels et al. | 701/38 |
| 2007/0096552 A1 | 5/2007 | Huber et al. | |

FOREIGN PATENT DOCUMENTS

| | | |
|---|---|---|
| DE | 43 27 759 | 3/1995 |
| DE | 198 18 982 | 11/1999 |
| DE | 103 24 438 | 12/2004 |
| EP | 1 188 634 | 3/2002 |

* cited by examiner

VALVE ARRANGEMENT FOR CONTROLLING A BRAKE SYSTEM OF A TRAILER VEHICLE

FIELD OF THE INVENTION

The present invention is based on a valve arrangement for controlling a brake system, comprising at least one spring brake cylinder and at least one service brake cylinder, of a trailer vehicle for a traction vehicle-trailer combination.

BACKGROUND INFORMATION

In modern trailer vehicles of traction vehicle-trailer combinations, what are referred to as combination cylinders are usually used as brake cylinders, which combination cylinders comprise, on the one hand, a service brake cylinder as an active service brake, which is ventilated in order to apply the brake and vented in order to release the brake, and, on the other hand, a spring brake cylinder as a passive parking brake, which is vented in order to apply the brake and ventilated in order to release the brake.

Figure 1:
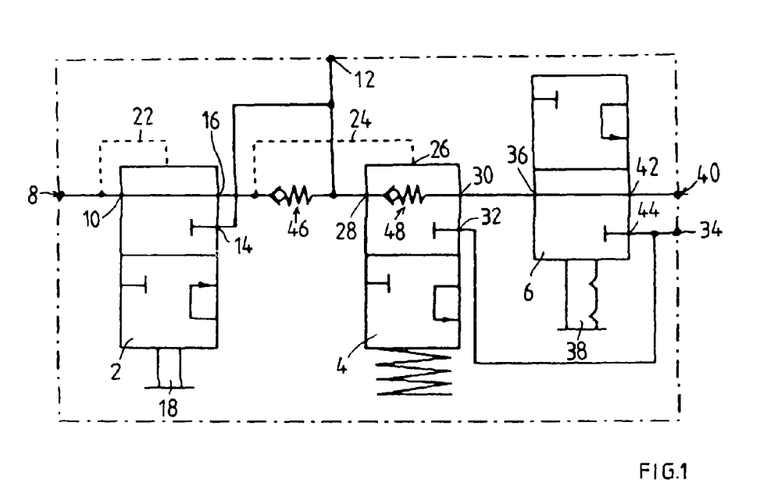
FIG. 1 shows a park/shunt valve arrangement 1 from the prior art.

FIG. 1 shows a park/shunt valve arrangement 1 from the prior art, which park/shunt valve arrangement 1 serves on the one hand, in a trailer vehicle of a traction vehicle-trailer combination, when parking with the trailer still coupled at the coupling head, to vent the spring brake cylinders so that the spring brake is applied ("parking function"). On the other hand, legislators require that the spring brake is applied automatically in the event of tearing off the compressed air supply of the trailer vehicle ("tear-off function"). This function is also integrated into the known park/shunt valve arrangement 1. Last but not least, the tear-off function must also be capable of being deactivated if the trailer is to be maneuvered in the uncoupled state by a vehicle without a compressed air supply. This shunting function is also carried out by the park/shunt valve arrangement 1 in the prior art.

According to the diagram of the prior art park/shunt valve arrangement 1 in FIG. 1, said park/shunt valve arrangement 1 comprises a shunting valve 2 which is assigned to the shunting function, a tear-off valve 4 which is assigned to the tear-off function, and a parking valve 6 which is assigned to the parking function.

The shunting valve 2 is a 3/2 way valve which can be activated by a switch 18 into a first switched position, in which an inlet 10 which is connected by a coupling connection 8 to the "supply" coupling head of the trailer vehicle is closed and an inlet 14 which is connected by a supply connection 12 to a trailer-vehicle-side compressed air supply is connected to an outlet 16, and which 3/2 way valve can be switched pneumatically into a second switched position, in which the inlet 10 which is connected to the coupling connection 8 is switched through to the outlet 16, by the supply pressure which is present at a control inlet 20 and is conducted from the coupling connection 8 via a control line 22. However, the shunting valve 2 can be activated into the first switched position by the switch 18 only if the pressure at the control inlet 20 is lower than a predefined limiting pressure, for example lower than the supply pressure at the coupling connection 8.

The outlet 16 of the shunting valve 2 is connected via a control line 24 to a control inlet 26 of the tear-off valve 4, which is embodied, on the one hand, as a control-pressure-activated 3/2 way valve, and on the other hand, also as a spring-activated 3/2 way valve, and to an inlet 28 of this valve 4. In its first, spring-activated switched position, the tear-off valve 4 closes the inlet 28 and connects its outlet 30 to a further outlet 32 which is connected to a venting connection 34. In its second, pressure-activated switched position, said tear-off valve 4 switches through its inlet 28 to the outlet 30 and closes the further outlet 32 which is connected to the venting connection 34. As long as a sufficient control pressure is present at its control inlet 26, the first spring-activated switched position cannot be assumed.

An inlet 36 of the parking valve 6, which is also embodied as a 3/2 way valve, is connected to the one outlet 30 of the tear-off valve 4. The parking valve 6 is activated in a purely mechanical way, while, when a switch 38 is activated in accordance with a first switched position, the inlet 36 is closed and an outlet 42, which is connected to a shuttle valve connection 40, is connected to a further outlet 44, which is connected to the venting connection 34. In contrast, according to a second switched position which is shown in FIG. 1, the inlet 36 is connected to the outlet 42 which leads to the shuttle valve connection 40 which is connected to the spring brake cylinders of the trailer vehicle. The first and second switched positions of the parking valve 6 can be locked or latched.

Two non-return valves 46, 48 between the outlet 16 of the shunting valve 2 and the inlet 28 of the tear-off valve 4 or said inlet 28 and the one outlet 30 of the tear-off valve 4 ensure that compressed air can flow only in the respectively permitted direction.

Figure 2:
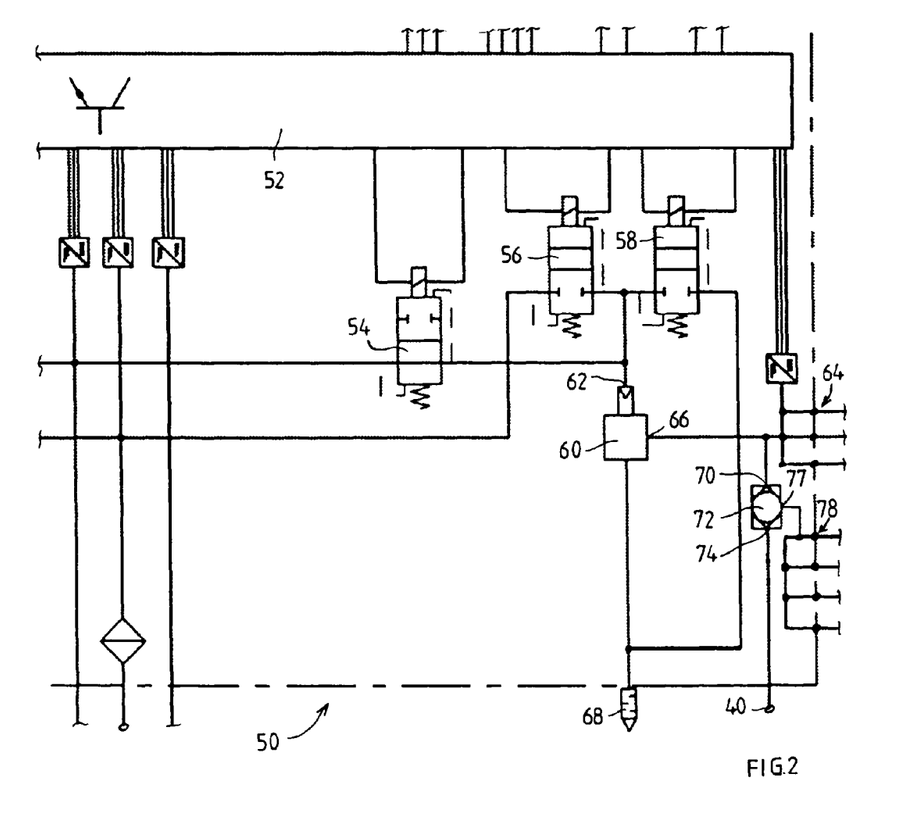
FIG. 2 shows a detail of a circuit diagram of a known pressure regulating module 50 which is assigned to the trailer and which interacts with the park/shunt valve arrangement 1 in FIG. 1.

FIG. 2 shows a detail of a circuit diagram of a known pressure regulating module 50 which is assigned to the trailer and which interacts with the park/shunt valve arrangement 1 in FIG. 1. The pressure regulating module 50 includes, controlled in a known fashion by an electronic control device 52, a backup valve 54, an inlet valve 56 and an outlet valve 58, which actuate a relay valve 60 which modulates, as a function of a control pressure present at its control inlet 62, a brake pressure at its outlet 66 which is connected to service brake connections 64 for the service brake cylinders, and/or connects these connections 64 to a venting connection 68. The outlet 66 of the relay valve 60 is also connected to an inlet 70 of a shuttle valve 72, the further inlet 74 of which is connected to the shuttle valve connection 40 of the park/shunt valve arrangement 1 in FIG. 1. The shuttle valve 72 transmits the greater pressure of pressures prevailing at its two inlets 70, 74, these being, on the one hand, the service brake pressure modulated by the relay valve 60 and, on the other hand, the supply pressure present at the shuttle valve connection 40, to its outlet 77 which is connected to spring-type connections 78 which lead to the spring brake cylinders. The shuttle valve 72 serves to prevent overloading of the components of the spring brake cylinders by superimposing the supply pressure on the service brake pressure (force limitation).

When the trailer vehicle is coupled in the travel mode, supply pressure which is conducted from the shuttle valve connection 40 of the park/shunt valve arrangement 1 in FIG. 1 via the "supply" coupling head passes to the one inlet 74 of the shuttle valve 72, while the other inlet 70 is supplied with the service brake pressure of the relay valve 60 during the operation of the service brake, which service brake pressure is generally derived from the supply pressure and is therefore lower than said supply pressure. For this reason, the supply pressure which is present at the one inlet 74 of the shuttle valve 72 is usually transmitted to the spring-type connections 78 in order to keep the spring brakes released in the travel mode.

Against this background, the method of functioning is as follows: during operation, i.e. when the traction vehicle-trailer combination is traveling, the valves 2, 4 and 6 are in the switched-through positions shown in FIG. 1, in which the supply pressure which is present at the coupling connection 8 and is conducted from the traction vehicle is transmitted through the valves 2, 4 and 6 to the shuttle valve connection 40. In this context, the supply pressure is present at the control inlet 26 of the tear-off valve 4, and therefore sufficient control pressure is present to hold said tear-off valve 4 in the second switched position counter to the effect of the valve spring, in which second switched position its inlet 28 is switched through to the outlet 30. Since the supply pressure is generally higher than the service brake pressure which is derived therefrom, the supply pressure prevails over the service brake pressure at the shuttle valve 72 and ventilates the spring brake cylinders in order to keep the spring brakes released.

After the traction vehicle-trailer combination has been braked with the active service brake in order to park it, the parking brake can be applied with the trailer still coupled to the traction vehicle ("parking function"). To do this, the driver of the vehicle activates the switch 38 and moves the parking valve 6 from the second switched position shown in FIG. 1 into the first switched position in which it connects the shuttle valve connection 40 to the venting connection 34, while its inlet 36 is closed. Compressed air therefore flows from the spring brake cylinders via the spring-type connections 78, the shuttle valve 72, the shuttle valve connection 40 and the venting connection 34 into the open air, as a result of which the spring brake cylinders are vented and the spring brakes are applied for parking. At the same time, the closed inlet 36 prevents the supply pressure which is present at the coupling connection 8 from being able to flow out.

If, on the other hand, the trailer vehicle which is being braked to a stationary state by the service brake is decoupled from the traction vehicle without activation of the parking valve 6, the pressure at the coupling connection 8 drops rapidly, as it also does at the control connection 26 of the tear-off valve 4, as a result of which the latter switches over under spring activation from the second switched position (shown in FIG. 1), in to the first switched position in which its outlet 30, which is switched through to the shuttle valve connection 40 via the parking valve 6, is connected to the venting connection 34, as a result of which the spring brake cylinders are automatically vented and the spring brakes are applied. In contrast, the inlet 28 of the tear-off valve 4 is closed, with the result that compressed air cannot flow out from the supply connection 12. The described sequence occurs even when the hose connection is torn off or a leak occurs in the hose connection between the "supply" coupling head of the traction vehicle and the "supply" coupling head of the trailer, because the pressure at the coupling connection 8 then also drops rapidly (tear-off function).

If leakage or tearing off therefore occurs in the hose connection between the traction vehicle and the trailer, the pressure at the "supply" coupling head, at the coupling connection 8 and at the control connection 26 of the tear-off valve 4 therefore decreases rapidly, as a result of which said tear-off valve 4 switches over under spring activation from the second switched position shown in FIG. 1 into the first switched position in which its outlet 30 which is switched through to the shuttle valve connection 40 is connected to the venting connection 34, with the result that the pressure at the shuttle valve connection 40 and therefore also at the inlet 74 of the shuttle valve 72 also drops.

If the driver does not brake with the service brake, the pressure at the other inlet 70 of the shuttle valve is also low, with the result that the overall low pressure at the outlet 76 of the shuttle valve leads to automatic application of the spring-loaded cylinders. However, if the driver brakes, the shuttle valve 72 switches through the now higher brake pressure at its outlet 76 and conducts it to the spring brake cylinders, for which reason the spring brake is released. However, at the same time, the service brake pressure is also present at the service brake connections 64, as a result of which the service brake is applied, with the result that the requirement for braking of the trailer vehicle after a leak or tearing off of a hose is met. If the brake pressure is low enough for the spring brakes to be able to be applied, the braking force is composed of the braking force of the service brake and the braking force of the spring brake, as a result of which the condition of braking of the trailer vehicle in the case of leakage or tearing off of a hose is again met.

If it is desirable to move or to maneuver the parked trailer vehicle, braked by the spring brakes, by a vehicle without a compressed air supply, for example by a fork lift truck (shunting function), the spring brake must be released. To do this, an operator activates the switch 18 of the shunting valve 2, as a result of which the supply connection 12 which is connected to the compressed air supply which is connected to the trailer is switched through to the shuttle valve connection 40 via the switched-through tear-off valve 4 and the switched-through parking valve 6. As a result, the spring brake cylinders are ventilated and therefore the spring brakes are released.

Generally, at least the following functions are therefore, carried out by a valve arrangement for controlling a brake system, comprising at least one spring brake cylinder and at least one service brake cylinder, of a trailer vehicle of a traction vehicle-trailer combination:

a) a first function (tear-off function) according to which the trailer vehicle is braked if there is an interrupted or disrupted compressed air connection between the traction vehicle and the trailer vehicle,    b) a second function (shunting function) according to which the spring brake is released as a function of an external signal by the supply pressure of a trailer-vehicle-side compressed air supply when there is an interrupted compressed air connection between the traction vehicle and the trailer vehicle,    c) a third function (parking function) according to which the spring brake is applied as a function of a further external signal when the trailer vehicle is coupled, and    d) a fourth function according to which either a service brake pressure which is modulated for the service brake by a control valve device or a supply pressure is transmitted to the spring brake in order to release the latter or keep it released.

In contrast, the exemplary embodiments and/or exemplary methods of the present invention is based on the object of developing a valve arrangement of the type mentioned at the beginning in such a way that the functions specified above are carried out with as little expenditure as possible or by using as few valves or components as possible, in order to obtain a valve arrangement which is more cost-effective and simpler in design.

SUMMARY OF THE INVENTION

According to the exemplary embodiments and/or exemplary methods of the present invention this object is achieved by the features described herein.

According to the exemplary embodiments and/or exemplary methods of the present invention, the valve arrangement includes a 3/2 way valve which, as a function of the control pressure present at its control inlet, connects either its connection, which is connected to an outlet of a control valve device in order to generate service brake pressure for the at least one service brake cylinder, or connects its connection, which is connected to a trailer-vehicle-side compressed air supply, to its further connection which is connected to the at least one spring brake cylinder.

As a result, the tear-off function of the tear-off valve and the function of the shuttle valve from the prior art described in detail at the beginning are integrated into the second valve device, which may be formed by a single 3/2 way valve. As a result, the abovementioned two functions can be carried out by just a single valve instead of by two valves, which results in a valve arrangement which is more cost-effective and simpler in design.

In the prior art described at the beginning, the supply pressure from the trailer-vehicle-side compressed air supply is used only for the shunting function (referred to as function a) above), but otherwise the compressed air for releasing the spring brake or keeping the spring brake released from the "supply" coupling head is used, and a relatively large volume of air is required for this. For this reason, the compressed air lines which lead from the "supply" coupling head to the spring brake cylinders and are relatively long have to be given large dimensions.

If, on the other hand, as in the case of the exemplary embodiments and/or exemplary methods of the present invention, the compressed air from the trailer-vehicle-side compressed air supply is used not only for the shunting function but also for the other functions of releasing the spring brake or keeping the spring brake released, and this compressed air supply is arranged centrally, compressed air lines with relatively large dimensions can be made shorter. Because a relatively small quantity of air is sufficient to actuate the second control valve device with control compressed air, the compressed air lines which conduct the control compressed air from the "supply" coupling head to the second valve device can be given relatively small dimensions. These measures therefore also contribute advantageously to reducing the costs of the valve arrangement.

The measures which are specified herein make advantageous developments and improvements of the exemplary embodiments and/or exemplary methods of the present invention specified herein possible.

More precise details can be found in the following description of an exemplary embodiment.

DETAILED DESCRIPTION

Figure 3:
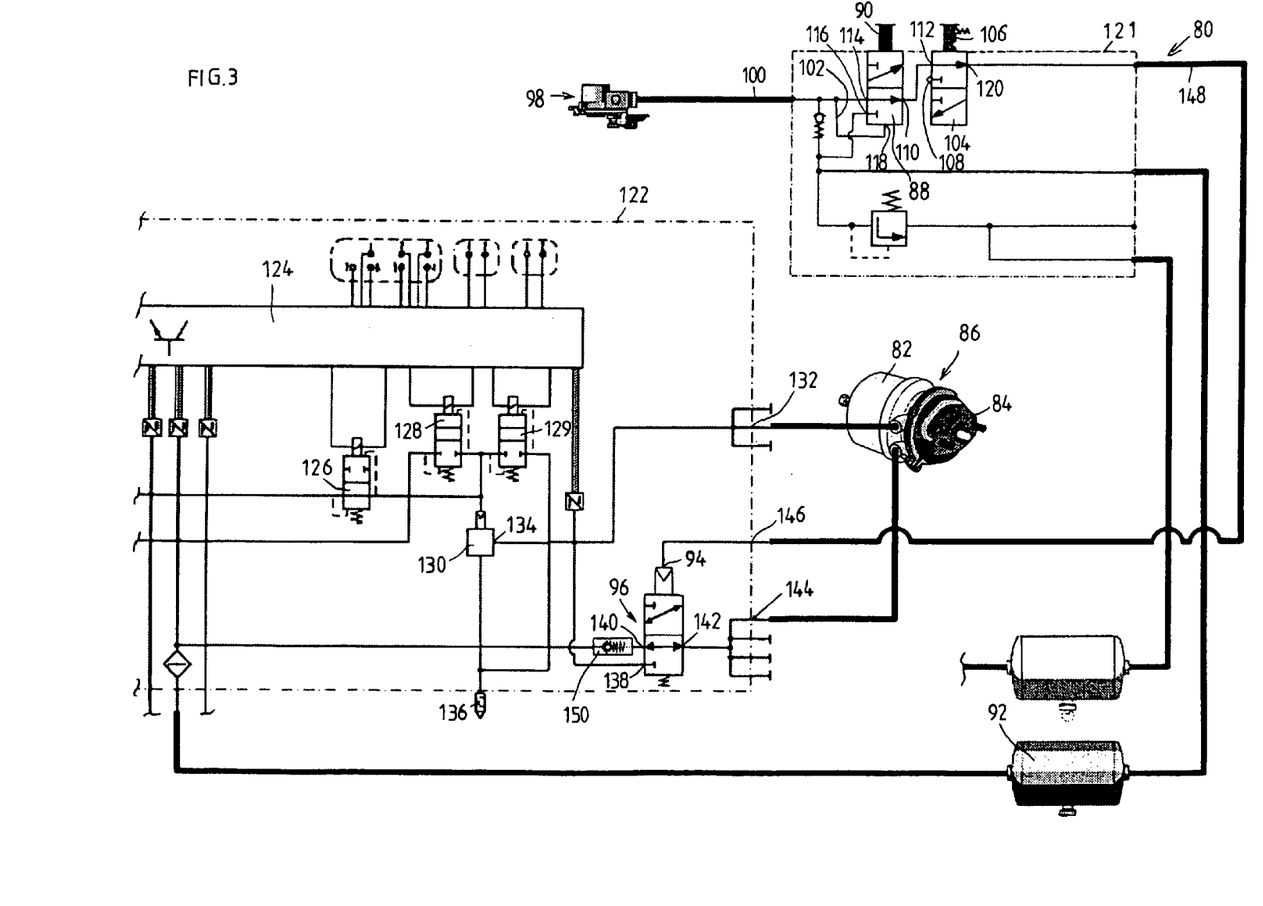
FIG. 3 shows a schematic circuit diagram of a valve arrangement according to an embodiment of the present invention in a first switched position.
Figure 4:
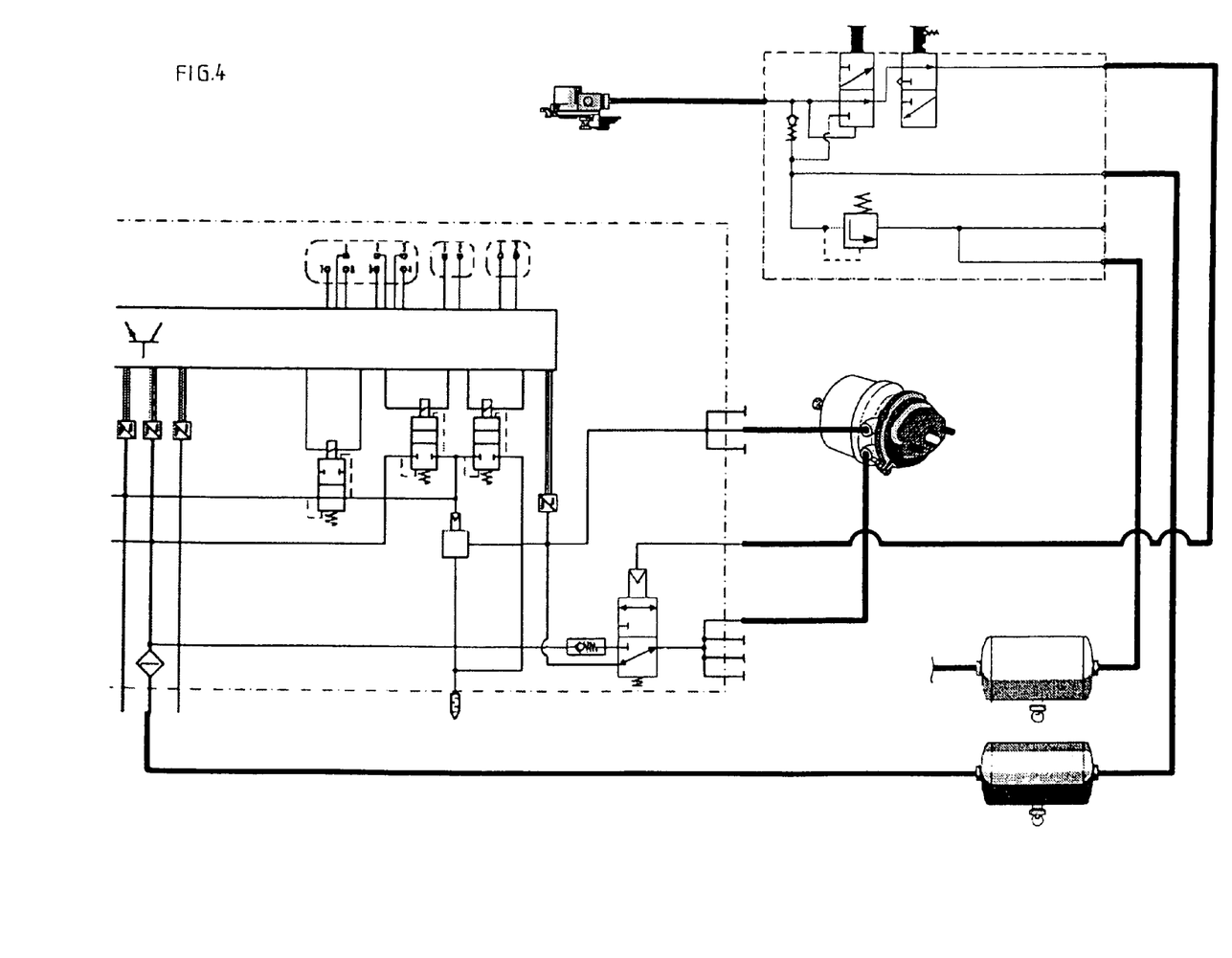
FIG. 4 shows a schematic circuit diagram of the valve arrangement from FIG. 3 in a second switched position.

In the exemplary embodiment which is shown in FIGS. 3 and 4 for a valve arrangement 80 according to the present invention for controlling a brake system, comprising at least one spring brake cylinder 82 and at least one service brake cylinder 84, of a trailer vehicle of a traction vehicle-trailer combination, a combination cylinder 86 is used as a brake cylinder which comprises, on the one hand, the service brake cylinder 84 as an active service brake, which is ventilated in order to apply the brake and vented in order to release the brake, and, on the other hand, the spring brake cylinder 82 with a storage spring as a passive parking brake, which is vented in order to apply the brake and ventilated in order to release the brake. In this context, the service brake cylinder 84 and the spring brake cylinder 82 are arranged in series. The design of such a combination cylinder 86 is adequately known, for example from DE 29 23 359 C2. For this reason, more details will not be given on this. For the sake of simplification, the combination cylinder 86 in FIG. 3 and FIG. 4 is representative of a plurality of combination cylinders of the trailer vehicle.

The valve arrangement 80 comprises a first valve device as a shunting valve 88, for example in the form of a 3/2 way valve, which, when activated by a first external signal, for example by a mechanical switch 90, transmits the supply pressure of a trailer-vehicle-side compressed air supply 92 to a control inlet 94 of a second valve device 96 and otherwise connects this control inlet 94 to a "supply" coupling head 98 of the trailer vehicle. On the control side, the shunting valve 88 is manually activated, for example, on the one hand by the switch 90 and on the other hand by the supply pressure which is conducted from the traction vehicle and is fed via a control line 102 which is branched off from a supply pressure line 100 which is connected to a "supply" coupling head 98.

The valve arrangement 80 also comprises a third valve device 104 as a parking valve, for example in the form of a 3/2 way valve, which, when activated by a third external signal, for example likewise by a mechanical switch 106, connects the control inlet 94 of the second valve device 96 to a venting arrangement 108 and otherwise connects this control inlet 94 to the "supply" coupling head 98 of the trailer vehicle.

The shunting valve 88 and the parking valve 104 may be connected in series, wherein an outlet 110 of the shunting valve 88 is connected to an inlet 112 of the parking valve 104. When the parking valve 104 is switched through, the pressure which is present at the outlet 110 of the shunting valve 88, that is to say either the supply pressure which is conducted from the "supply" coupling head 98 and originates from the traction vehicle or the supply pressure which is conducted from the trailer-vehicle-side compressed air supply 92, can be fed through the switched-through parking valve 104 in order to supply the control inlet 94 of the second valve device 96.

The shunting valve 88 is switched into a first switched position, in which an inlet 114 which is connected to the "supply" coupling head 98 of the trailer vehicle is closed and an inlet 116 which is connected to the trailer-vehicle-side compressed air supply 92 is connected to the outlet 110, by activating the switch 90 which in turn activates a valve body of the shunting valve 88. On the other hand, the shunting valve 88 is pneumatically switched in to a second switched position, or held in a second switched position, in which the inlet 114 which is connected to the "supply" coupling head 98 is switched through to the outlet 110, by the supply pressure which is present at a control inlet 118 and is conducted from the "supply" coupling head 98 via the control line 102.

Likewise, the parking valve 104 is switched into a first switched position in which an outlet 120 which is connected to the control inlet 94 of the second valve device 96 is connected to the venting arrangement 108, by the assigned switch 106 which in turn activates a valve body of the parking valve 104. The parking valve 104 is embodied, for example, as a latching valve or locking valve in such a way that it locks in its respectively set switched position and not until there is a corresponding activation of the switch 106 can it be switched over, for example, into a second switched position in which the outlet 120 which is connected to the control inlet 94 of the second valve device 96 is connected to the inlet 112 which is directly connected to the outlet 110 of the first valve device (shunting valve) 88.

The shunting valve 88 and the parking valve 104 may be integrated into one structural unit 121, for example by accommodating the two 3/2 way valves 88, 104 in a common housing which is easily accessible from the outside, so that the switches 90 and 106 can be respectively activated by an operator. This structural unit 121 is connected via corresponding connections and compressed air lines to the compressed air supply 92, the second valve device 96 and to the "supply" coupling head 98. The structural unit 121 also may include a gate valve whose function relates to an air suspension system and therefore not to the present invention, and which is therefore not explained in more detail here.

The second valve device 96, which may also be embodied as a 3/2 way valve, modulates, as a function of the control pressure which is present at its control inlet 94, either a service brake pressure, which is modulated by a control valve device 122 for the service brake, or the supply pressure of the trailer-vehicle-side compressed air supply 92 to the spring brake cylinder 82. To be more precise, in the case of the second valve device 96, when a control pressure which exceeds a limiting pressure is present at its control inlet 94, the supply pressure of the trailer-vehicle-side compressed air supply 92 is modulated to the at least one spring brake cylinder 82, and otherwise the service brake pressure which is modulated by the control valve device 122 for the service brake or the service brake cylinder 84 is modulated with spring activation, to the at least one spring brake cylinder 82.

The control valve device 122 for the service brake is formed by an electro-pneumatic pressure regulating module, which generates the service brake pressure as a function of a service brake request signal which is triggered by the driver of the traction vehicle and is fed into the trailer vehicle via a data bus. The pressure regulating module 122 comprises, in a known fashion, an electronic control device 124 which controls said pressure regulating module 122, a backup valve 126, an inlet valve 128 and an outlet valve 129. These valves 126, 128 and 129 actuate in turn a relay valve 130 which, as a function of a control pressure which is present at its control inlet 94, modulates a service brake pressure to its outlet 134 which is connected to a service brake connection 132 for the service brake cylinder 84, or connects said service brake connection 132 to a venting connection 136. Furthermore, the outlet 134 of the relay valve 130 is connected to an inlet 138 of the 3/2 way valve 96 which forms the second valve device. The other inlet 140 of the second valve device 96 is connected to the compressed air supply 92 of the trailer vehicle, and its outlet 142 is connected to a spring-type connection 144 for the spring brake cylinder 82 of the combination cylinder 86. A control pressure line 148, which extends from the outlet 120 of the parking valve 104, is connected via a control connection 146 to the control inlet 94 of the second valve device 96.

The second valve device 96 may be integrated into the pressure regulating module 122, for example by accommodating the 3/2 way valve 96 in a common housing with the further valves 126, 128, 129, 130 and the electronic control device 124, and it is connected via corresponding connections, for example 132, 144, 146 and compressed air lines 148, to the trailer-side compressed air supply 92, the spring brake cylinder 82, the service brake cylinder 84 and to the parking valve 104. Last but not least, a non-return valve 150 is arranged between the second valve device 96 and the trailer-side compressed air supply 92.

Against this background, the method of functioning of the valve device 80 is as follows: in undisrupted operation, i.e. when the traction vehicle-trailer combination is traveling, the first, second and third valve devices 88, 96, 104 are in the switched-through positions shown in FIG. 3 in which the supply pressure which is present at the "supply" coupling head 98 and is conducted from the traction vehicle is transmitted through the first and third valve devices 88, 104 to the control inlet 94 of the second valve device 96 in order to keep the spring brake cylinder 82 ventilated and the spring brake correspondingly released. In this context, the supply pressure in the control line 102 holds the shunting valve 88 in its second switched position. The shunting valve 88 is embodied in such a way that it cannot be switched by the switch 90 into the first switched position counter to the control pressure which exceeds a specific limiting value and is present at the control inlet 118 of said shunting valve 88.

The control pressure which is present at the control inlet 94 of the second valve device 96 and is higher than a predefined pressure limiting value holds said valve device 96, counter to the spring force of the valve spring, in a switched position in which its inlet 140, connected to the trailer-vehicle-side compressed air supply 92, is connected to the spring-type connection 144 and therefore to the spring brake cylinder 82. The compressed air which is fed from the trailer-vehicle-side compressed air supply 92 into the spring brake cylinder 82 ensures that the spring-type piston is forced into a retracted position counter to the force of the storage spring, and as a result the spring brake remains released. In contrast, the service brake can continue to be activated by the pressure regulating module 122 independently of the spring brake in order to brake the coupled traction vehicle-trailer combination.

After the traction vehicle-trailer combination has been braked with the active service brake in order to park it, the parking brake can be applied when the trailer is still coupled to the traction vehicle ("parking function"). To do this, the vehicle driver activates the switch 106 of the parking valve 104 and as a result moves it from the second switched position shown in FIG. 3 into the first switched position in which it connects the control inlet 94 of the second valve device 96 to its venting arrangement 108 via the control pressure line 148, while its inlet 112 is closed. The closed inlet 112 of the parking valve 104 prevents the supply pressure which is still present at the "supply" coupling head 98 from still being able to flow out. Compressed air therefore flows out of the control pressure line 148 into the open air, as a result of which the pressure at the control inlet 94 of the second valve device 96 drops below the limiting value and the latter therefore switches over, under spring activation, from the position according to FIG. 3 into the position in FIG. 4 in which its outlet 142, which is connected to the spring-type connection 144, is connected to its inlet 138 and therefore to the outlet 134 of the relay valve 130 which conducts the service brake pressure.

If the driver then no longer activates the service brake, or only activates it with such a low braking request that the service brake pressure is below the release pressure of the spring brake, the low service brake pressure in the spring brake cylinder 82 causes the spring brake to be applied.

However, if the driver also activates the service brake in the parked state with a service brake pressure which is above the release pressure of the spring brake, the spring brake remains released and the service brake which is applied with service brake pressure holds the traction vehicle-trailer combination in the braked state.

If the service brake pressure is slightly lower than the release pressure of the spring brake but higher than the application pressure of the service brake, both the spring brake and the service brake can be applied and the overall braking force is composed of the braking force of the service brake and the braking force of the spring brake, by which means the traction vehicle-trailer combination is in turn held in the braked state. After the release of the service brake which is initiated by the driver, the spring brake is applied, as described above, with a maximum spring braking force.

If, on the other hand, the trailer which is braked to the stationary state by the service brake is decoupled from the traction vehicle without previous switch activation of the parking valve 104, the pressure at the "supply" coupling head 98 drops rapidly. This drop in pressure does not have any influence on the switched positions of the shunting valve 88 or of the parking valve 104 because, on the one hand, the shunting valve 88 would firstly have to be activated via the switch 90 in order to switch over counter to the control pressure which is now no longer present in the control line 102 and at the control inlet 118 and because, on the other hand, the parking valve 104 is mechanically locked in its open position. For this reason, the control pressure at the control inlet 94 of the second valve device 96 also drops because of the switched-through valves 88 and 104, respectively. Accordingly, said second valve device 96 switches over, under spring activation, from the switched position shown in FIG. 3 into the switched position according to FIG. 4 in which its outlet 142 which is connected to the spring-type connection 144 is connected to its inlet 138 and therefore to the outlet 134 of the relay valve 130 which conducts the service brake pressure. However, since the trailer vehicle is decoupled from the traction vehicle, this brake pressure is so low that it is below the release pressure of the spring brake, with the result that the spring brake is applied and it keeps the trailer vehicle in the braked state.

The abovementioned application of the spring brake when the "supply" coupling head 98 is no longer supplied with sufficient pressure occurs even if tearing off of the hose connection or leakage in the hose connection occurs between the "supply" coupling head of the traction vehicle and the "supply" coupling head 98 of the trailer vehicle because the pressure at the "supply" coupling head 98 of the trailer vehicle then also drops rapidly ("tear-off function"). The automatic braking of the trailer which is required by legislators is therefore implemented in the event of tearing off of a hose or leakage.

If it is desirable to move or to maneuver (shunting function) the parked trailer which is braked using the spring brakes, by a vehicle without a compressed air supply, for example by a fork lift truck, the spring brake must be released. To do this, an operator activates the switch 90 of the shunting valve 88 counter to the control pressure which is now low owing to the open "supply" coupling head 98, as a result of which said shunting valve 88 is switched over into its first switched position and compressed air is switched through from the trailer-side compressed air supply 92 via its inlet 116, its outlet 110 and the switched-through parking valve 104 to the control inlet 94 of the second valve device 96, which parking valve 104 subsequently assumes again the switched position shown in FIG. 3 in which compressed air of the trailer-vehicle-side compressed air supply 92 ventilates the spring brake cylinder 82 and releases the spring brake.

Of course, the supply pressure of the trailer-vehicle-side compressed air supply 92 or the service brake pressure which is generated by the pressure regulating module 122 does not necessarily have to be used to carry out the functions described above with its original magnitude or its original value, but instead pressures which are derived therefrom or are changed in terms of the original pressure value can also be used.

According to the particular embodiment, the valve arrangement 80 according to the present invention therefore comprises at least the following:
- a) a first valve device 88 which, as a function of a first external signal, transmits the supply pressure of a trailer-vehicle-side compressed air supply 92 or a pressure derived from said supply pressure to a control inlet 94 of a second valve device 96 or connects said control inlet 94 to a "supply" coupling head 98 of the trailer vehicle,
- b) a third valve device 104 which, as a function of a third external signal, connects the control inlet 94 of the second valve device 96 to a venting arrangement 108 or connects this control inlet 94 to the "supply" coupling head 98 of the trailer vehicle, wherein
- c) the second valve device 96 modulates, as a function of the control pressure which is present at its control inlet 94, either a service brake pressure which is modulated by a control valve device 122 for the at least one service brake cylinder 84, or a pressure derived from said service brake pressure, or the supply pressure of the trailer-vehicle-side compressed air supply 92, or a pressure which is derived from said supply pressure, to the at least one spring brake cylinder 82.

The List of reference numbers is as follows:
1 Park/shunt valve arrangement
2 Shunt valve
4 Tear-off valve
6 Park valve
8 Coupling connection
10 Inlet
12 Supply connection
14 Inlet
16 Outlet
18 Switch
20 Control inlet
22 Control line
24 Control line
26 Control inlet
28 Inlet
30 Outlet
32 Outlet
34 Venting connection
36 Inlet
38 Switch
40 Shuttle valve connection
42 Outlet
44 Outlet
46 Non-return valve
48 Non-return valve
50 Pressure regulating module
52 Electrical control device
54 Backup valve
56 Inlet valve
58 Outlet valve
60 Relay valve
62 Control inlet
64 Service brake connections
66 Outlet
68 Venting connection
70 Inlet
72 Shuttle valve
74 Inlet
77 Outlet
78 Spring-type connections 80 Valve arrangement
82 Spring brake cylinder
84 Service brake cylinder
86 Combination cylinder
88 First valve device
90 Switch
92 Compressed air supply
94 Control inlet
96 Second valve device
98 Coupling head
100 Supply pressure line
102 Control line
104 Third valve device
106 Switch
108 Venting arrangement
110 Outlet
112 Inlet
114 Inlet
116 Inlet
118 Control inlet
120 Outlet
121 Structural unit
122 Control valve device
124 Electronic control device
126 Backup valve
128 Inlet valve
129 Outlet valve
130 Relay valve
132 Service brake connection
134 Outlet
136 Venting connection
138 Inlet
140 Inlet
142 Outlet
144 Spring-type connection
146 Control connection
148 Control pressure line
150 Non-return valve

The invention claimed is:

1. A valve arrangement for controlling a brake system having at least one spring brake cylinder and at least one service brake cylinder, which are of a trailer vehicle of a traction vehicle-trailer combination, comprising:
a 3/2 way valve which, as a function of a control pressure present at its control inlet, connects either its connection, which is connected to an outlet of a control valve device to generate service brake pressure for the at least one service brake cylinder, or connects its connection, which is connected to a trailer-vehicle-side compressed air supply, to its further connection which is connected to the at least one spring brake cylinder;
wherein the 3/2 way valve performs both a tear-off function and a shuttle function, and
wherein application of a spring brake when a supply coupling head is no longer supplied with sufficient pressure occurs even if tearing off of a hose connection or leakage in the hose connection occurs between the supply coupling head of the traction vehicle and the supply coupling head of the trailer vehicle because the pressure at the supply coupling head of the trailer vehicle then also drops, so that automatic braking of the trailer is implemented in the event of tearing off of the hose or the leakage in the hose connection.

2. The valve arrangement of claim 1, further comprising:
a valve device, which, as a function of an external signal, transmits the supply pressure of the trailer-vehicle-side compressed air supply or a pressure derived therefrom to the control inlet of the 3/2 way valve, or connects said control inlet to a "supply" coupling head of the trailer vehicle.

3. The valve arrangement of claim 2, wherein the valve device includes a another 3/2 way valve which can be switched by the external signal into a first switched position, in which an inlet which is connected to the "supply" coupling head of the trailer vehicle is closed and an inlet which is connected to the trailer-vehicle-side compressed air supply is connected to an outlet, and which 3/2 way valve can be switched pneumatically into a second switched position in which the inlet which is connected to the "supply" coupling head is switched through to the outlet by the supply pressure which is present at a control inlet and is conducted from the "supply" coupling head, or by a pressure which is derived from said supply pressure.

4. The valve arrangement of claim 2, wherein the external signal is triggered by a switch.

5. The valve arrangement of claim 1, further comprising:
another valve device which, as a function of another external signal, connects the control inlet of the 3/2 way valve to a venting arrangement or connects said control inlet to the "supply" coupling head of the trailer vehicle.

6. The valve arrangement of claim 5, wherein the another valve device includes another 3/2 way valve which can be switched by the another external signal into a first switched position, in which an outlet which is connected to the control inlet of the 3/2 way valve is connected to a venting arrangement, and which another 3/2 way valve can be switched into a second switched position, in which the outlet which is connected to the control inlet of the 3/2 way valve is connected to an inlet which is directly connected to the outlet of the valve device.

7. The valve arrangement of claim 5, wherein the another external signal is triggered by a switch.

8. The valve arrangement of claim 1, wherein, when a control pressure which exceeds a limiting pressure is present at a control inlet of the 3/2 way valve, said 3/2 way valve modulates the supply pressure of the trailer-vehicle-side compressed air supply or a pressure derived from said supply pressure and otherwise spring-activates the service brake pressure which is modulated by the control valve device for the at least one service brake cylinder, or modulates a pressure to the at least one spring brake cylinder, which is derived from said service brake pressure.

9. The valve arrangement of claim 8, wherein the service brake pressure is generated by an electro-pneumatic pressure regulating module which forms the control valve device for the at least one service brake cylinder.

10. The valve arrangement of claim 9, wherein the 3/2 way valve is integrated into the pressure regulating module.

11. The valve arrangement of claim 1, wherein a non-return valve is arranged between the 3/2 way valve and the trailer-side compressed air supply.

* * * * *